United States Patent [19]

Ruell

[11] Patent Number: 4,532,508

[45] Date of Patent: Jul. 30, 1985

[54] PERSONAL AUTHENTICATION SYSTEM

[75] Inventor: Hartwig Ruell, Fuerstenfeldbruck, Fed. Rep. of Germany

[73] Assignee: Siemens Corporate Research & Support, Inc., Iselin, N.J.

[21] Appl. No.: 481,198

[22] Filed: Apr. 1, 1983

[51] Int. Cl.³ .......................... H04Q 9/00; G06K 9/00; G06K 9/74

[52] U.S. Cl. ...................................... 340/825.34; 382/4

[58] Field of Search ......................... 340/825.34, 825.3; 356/71; 382/4, 31

[56] References Cited

U.S. PATENT DOCUMENTS

| | | | |
|---|---|---|---|
| 3,781,113 | 12/1973 | Thomas . | |
| 3,889,233 | 6/1975 | Ogiwara | 382/31 |
| 3,984,671 | 10/1976 | Fletcher et al. | 382/31 |
| 4,253,086 | 2/1981 | Szwarcbier | 382/4 |
| 4,414,684 | 11/1983 | Blonder | 382/4 |

OTHER PUBLICATIONS

"Credit Card System", E. C. Schuenzel et al., *IBM Technical Bulletin,* vol. 13, No. 1, Jun. 1970, pp. 176, 177.

"U.S. Patent Application Ser. No. 176,695 of H. Ruell", The LX 39 Latent Fingerprint Matcher, NBS, Special Publication 500-36, issued Aug. 1978.

"Manual and Automated Fingerprint Registration", NBS Technical Note 730, issued Jun. 1972.

"Lasar Focus", Jun. 1979, p. 85.

"Titus-Device", *IEEE Transactions on Computers,* vol. C24, No. 4, Apr. 1975, p. 393.

*Primary Examiner*—Donald J. Yusko
*Attorney, Agent, or Firm*—John F. Moran

[57] ABSTRACT

A method and apparatus for storing, in scrambled form, information relating to the personal features of a person. This information can be stored on a portable storage medium which can be carried by the person and used to gain access to a secured area by on-site decoding and verification of the stored information.

4 Claims, 2 Drawing Figures

PERSONAL AUTHENTICATION SYSTEM

BACKGROUND OF INVENTION

This invention relates to a method and apparatus for storing information corresponding to personal identification features on a portable storage medium and reading the information from the portable storage medium to verify a person's identity.

The use of credit cards and charge plates requires a means of positive identification which will prevent counterfeiting. In addition, the necessity of identifying persons for access to secured areas requires positive identification to prevent impersonation. Personal recognition is the ideal method of identification, but it is impractical except in a few situations.

An automatic personal verifier system described in U.S. Pat. No. 3,781,113, comprises a coherent optical matched-filter corrolator. It computes the two dimensional cross corrolation function between the present fingerprint and a fingerprint previously encoded on an identification card. If these fingerprints match, a bright spot of light is generated at the output of the optical system. If the prints fail to match, a random low-intensity light pattern is generated. Whenever the corrolated peak exceeds a preset threshold, a green light is turned on and a relay is closed. The relay closure is typically used to energize a door-lock solenoid. Each identification card in the automatic personal verifier system contains a small photographic film chip. The image recorded on this film chip is a coded version of the bearer's fingerprint. Any person seeking entrance to a facility protected by this automatic personal verifier system must deposit a fresh oil fingerprint on a special window. As previously mentioned, the system corrolates the fresh fingerprint with the stored fingerprint. If they match a green light is energized and the door is unlatched.

Although the system described in U.S. Pat. No. 3,781,113 provides some level of security, each person using the system and having the associated apparatus including the key to descramble the information fixed on the identification card, can read any confidential information stored on every identification card.

SUMMARY OF THE INVENTION

It is accordingly an object of the present invention to provide a method and apparatus for personal identification which can not be circumvented by unauthorized persons.

It is a further object of the present invention to provide a method and apparatus for a personal authentication system in which scrambled information corresponding to the user's personal features are stored on a portable storage medium.

It is a further object of the present invention to provide a method and apparatus for a personal authentication system in which the portable storage medium can be used to verify the identity of a person. The present invention provides a personal authentication system in which scrambled information corresponding to a person's personal features is stored on a portable storage medium. To accomplish this storage the personal features of a person are first sensed. Then information signals corresponding to the sensed personal features are derived and a characteristic scramble key is developed from the information signals. This scramble key is used to encode the information signals which are then stored on the portable storage medium.

The invention further provides a method and apparatus for verifying the identity of a person using a portable storage medium on which encoded personal identification information signals have been stored. The personal features of the person to be identified are sensed and present information signals corresponding to the sensed features are derived. Then a characteristic scramble key is developed from the present information signals and a first set of comparison encoded information signals stored on the portable storage medium are sensed and decoded with the characteristic scramble key developed from the present information signals. A second set of comparison signals are derived from the decoded information signals and compared to the first set of comparison signals to verify identity of the person.

Development of a characteristic scramble key from the personal features of the person seeking access and use of this scramble key for encoding and decoding purposes prevents unauthorized access to a protected facility. Theft of the apparatus which provides the scramble key only enables the person to read his personal identification card. Therefore, other identification cards cannot be read nor can access be gained by using identification cards belonging to other people.

This invention can utilize, for example, personal features such as fingerprints, speech and faces. In addition holograms, scrambled magnetic recording systems or a light modulating system can be used.

Other features and advantages of the invention will be apparent from the following description of the preferred embodiments, and from the claims.

For a full understanding of the present invention, reference should now be made to the following detailed description of preferred embodiments of the invention and to the accompanying drawings.

DESCRIPTION OF THE PREFERRED EMBODIMENTS

A preferred embodiment of the invention will now be described with reference to FIGS. 1 and 2 of the drawings.

Figure 1:
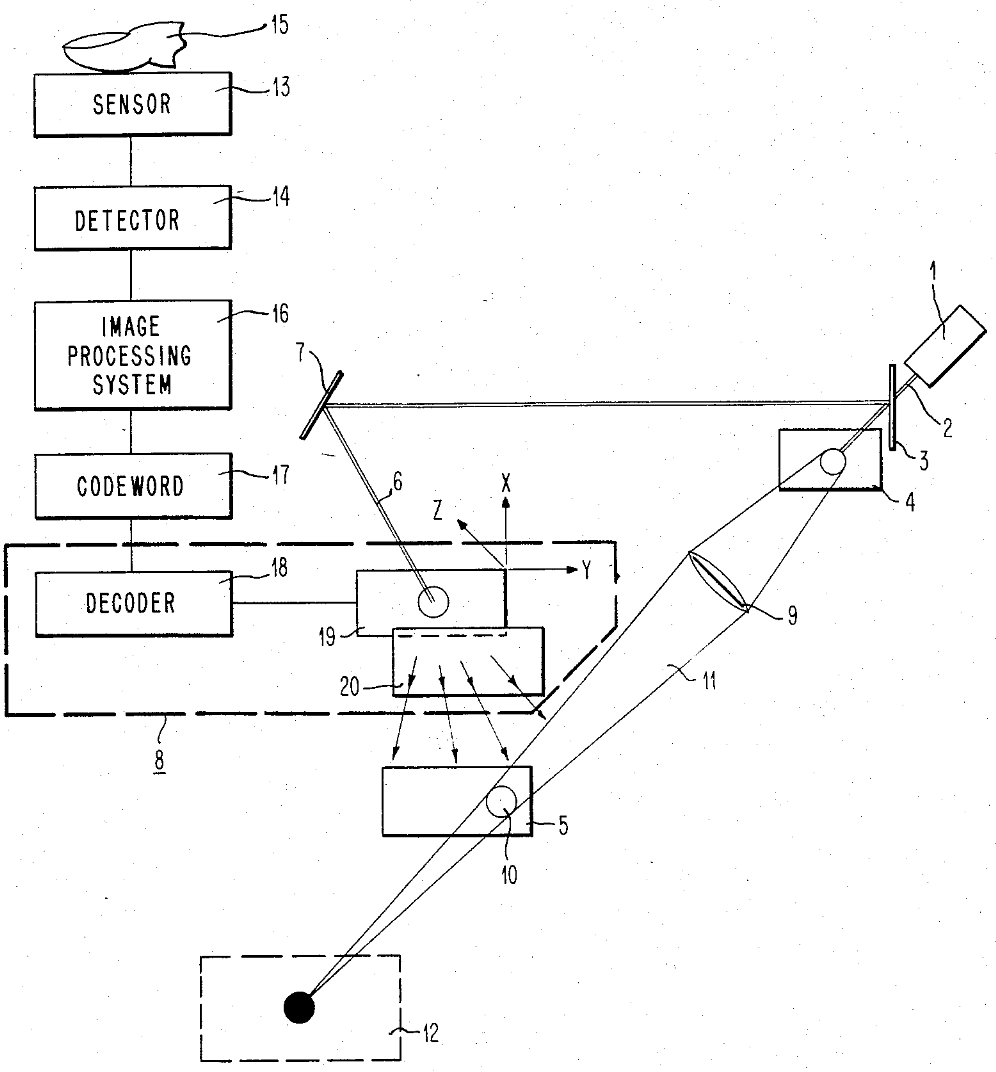
FIG. 1 is a schematic representation, partly in section, of apparatus for generating and storing scrambled information, corresponding to a personal feature, on a portable storage medium, wherein the personal features are derived from fingerprints and the storage medium is an identification card being made comprising a hologram.

Referring to FIG. 1, the apparatus for storing information uses a basic coherent light input in the form of a laser 1, which directs light beam 2 to beam splitter 3 and also to slide 4 which has on it a photograph of the fingerprint to be used in generating the holographic image stored on identification card 5. The beam splitter 3 directs reference laser beam 6 to mirror 7 and then to encoder 8 which will be described in more detail below.

The reference beam passing through encoder 8 impinges on card 5 superimposing the object beam 11, focused by lens 9, and creating a hologram. A sensitive film 10 is placed on card 5 and when the subject's fingerprint has been placed, by means of slide 4, within the object beam a holographic exposure is made with reference beam 6 and object beam 11. The lens is focused to provide real image 12 of the fingerprint slide a distance behind card 5.

To modulate or encode the reference laser beam 6, detector 14 detects personal features from a present fingerprint 15 of the subject to the identified. Detector 14, coupled to sensor 13, derives information signals corresponding to the sensed present fingerprint 15 and delivers these signals to am image processing system 16. A typical image processing system including a sensor, detector, and image processor is described in U.S. Pat. No. 4,340,300 issued July 20, 1982 to by the same inventor.

The image processing system creates a code word 17 based on the fingerprint features which consists of a sequence of binary digits that describes the features of the fingerprint according to rules used for fingerprint detection described in '*The LX*39 Latent Fingerprint Matcher", NBS Special Publication 500–36 issued August 1978 and in 'Manual and Automated Fingerprint Registration', NBS Technical Note 730 issued June 1972 and 'The M40 Fingerprint Matcher', Technical Note 878, 1972.

The code word represents a scramble key and is fed to an encoder 8 which includes an electronic decoder 18 and a mechanical device. The mechanical device comprises a coded aperture 19, consisting of a plate carrying an aperture of any shape whereby the plate can be moved in the x, y, or z directions, according to the coordinate axes, by electromotive means. The coded aperture, placed between the reference laser beam and the identification card, modulates the reference laser beam. The laser beam is then dispersed by dispersing unit 20 which consists of ground glass. The encoder, typically referred to as a general optical element, changes the phase and/or amplitude of the laser beam passing through it. If the coded aperture is used as a reflecting element the laser beam is reflected by that element randomly.

The coded aperture 19, mechanically moved in three directions including circular movement by the encoder, acts as a means for scrambling the reference laser beam, to create a scrambled hologram for use on the identification card. The scrambling depends on the fingerprint of the person to be registered.

It is also possible to use an electronically controlled decoder or an electro-optical pattern generator such as described, for example, in "Laser Focus", June 1979, page 85 or "Titus-device", IEEE Transactions on Computers, Vol. C24, No. 3, April 1975, page 393, in place of the mechanical encoder.

The identification card now carries a photograph of an encoded hologram of the persons fingerprint on film 10, which is encoded by a scramble key derived from the present fingerprint 15.

Figure 2:
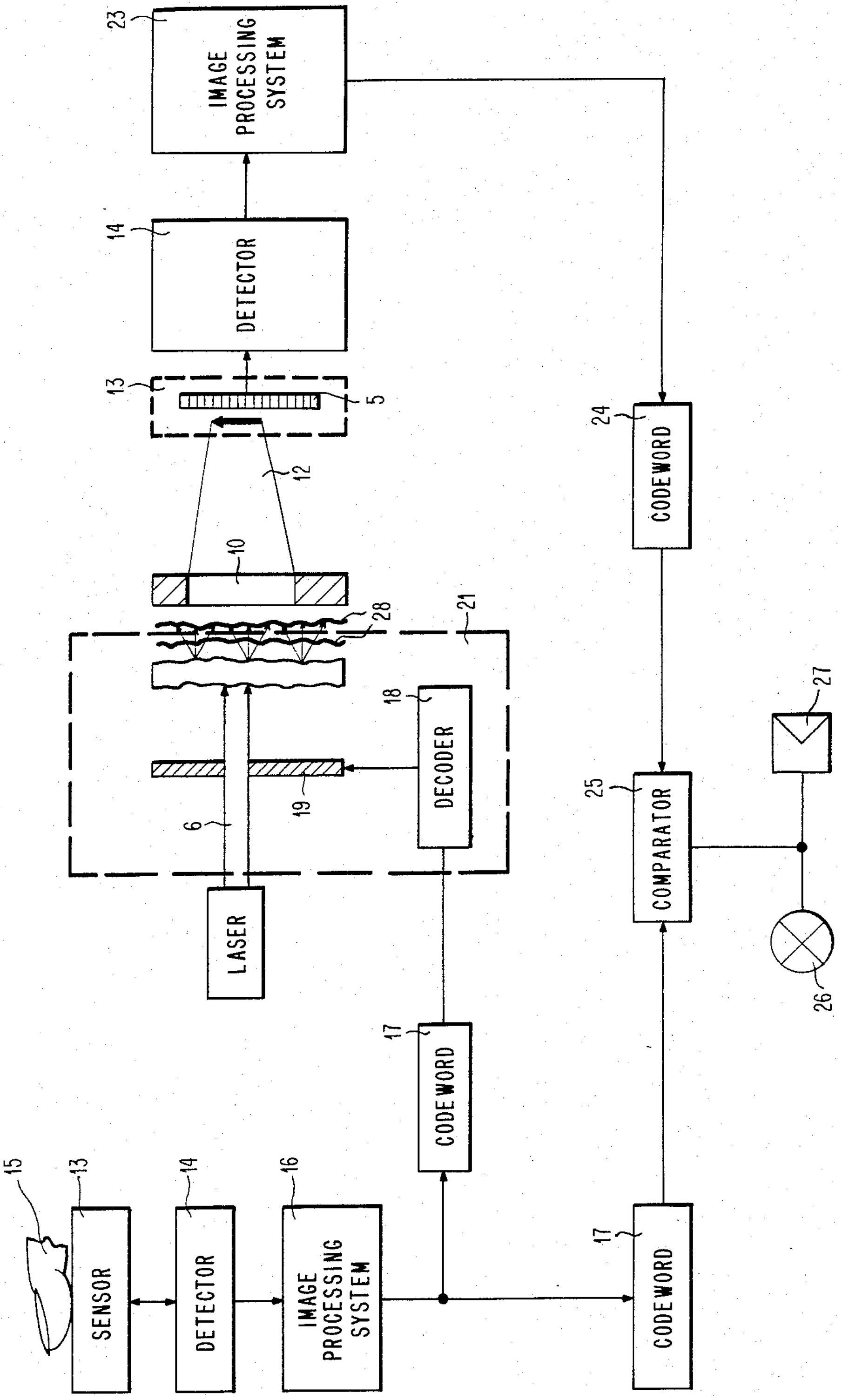
FIG. 2 is a schematic representation, partly in section, of apparatus for verifying the identity of a person using an identification card made in accordance with FIG. 1 on which encoded personal identification information signals derived from fingerprints have been stored by means of a hologram.

Referring to FIG. 2, the use of card 5 in a personal authentication system will be described. Any person entering facilities secured by the personal authenication system according to the invention, inserts his identification card, which carries his encoded fingerprint hologram into a decoding apparatus. At substantially the same time he must deposit a fresh fingerprint 15 on sensor 13, coupled to detector 14, which senses the fingerprint and derives present information signals corresponding to the sensed fingerprint. The image processing system 16 coupled to detector 14, develops a characteristic code word 17 which represents a scramble key as previously described. The code word 17 is delivered to decoder unit 21 which operates and is designed as already described. The encoder moves coded aperture 19 by mechanical means according to code word 17. Thereby, reference laser beam 6 is shaped by the coded aperture 19 in the same way as it is modulated during the production of the identification card. The reference laser beam them impinges on the ground glass dispersing unit 20 to create a dispersed reference laser beam 28.

To decode the hologram on film 10, card 5 is lighted by the dispersed and shaped or modulated demodulated reference laser beam 28, and a decoded real image 12 of the fingerprint is projected onto a photo-optical sensor 22. The sensor 22 is located the same distance from the card as the real image of the fingerprint is located from the card shown in FIG. 1. This represents an integral part of the sensor-detector system used for developing information signals. In other words, the decoder unit 21 serves to unscramble the holographic image stored on film 10 to provide a code word derived from the decoded real image from the stored image which corresponds to codeword being generated directly from finger 15.

A second image processing system 23, which operates and is designed according to image processing system 16, which has already been discussed, develops a second code word 24 based on the decoded image projected on the sensor. This code word consists of a series of binary digits.

A comparator 25 coupled to the imaging processing system 16 of the present fingerprint and to the second image processing system 23 of the decoded fingerprint compares both code words. If the code word 17 derived from the present fingerprint matches the code word 24 derived from the stored and decoded fingerprint, a light 26 is energized and door 27 is unlocked.

There has thus been shown and described novel apparatus for producing a Personal Authentication System which fulfills all the objects and advantages sought therefore. Many changes, modifications, variations and other uses and applications of the subject invention will, however, become apparent to those skilled in the art after considering this specification and the accompanying drawings which disclose preferred embodiments thereof. All such changes, modifications, variations and other uses and applications which do not depart from the spirit and scope of the invention are deemed to be covered by the invention which is limited only by the claims which follow.

What is claimed is:

1. The method of storing scrambled information on a portable storage medium using a coherent light beam for personal identification purposes, which comprises the steps of:

(a) sensing the personal features of a person;

(b) deriving at least one information signal indicative of said sensed personal features;

(c) developing a distinct scramble key directly from the sensed personal features indicated by said information signal;

(d) using said scramble key to encode the coherent light beam to produce a modulated reference light beam; and (e) storing a holographic image on said portable storage medium using said modulated reference light beam.

2. The method of verifying the identity of a person using a portable storage medium on which encoded personal identification information signals have been stored, which comprises, the steps of:

(a) sensing the personal features of said person to be identified;

(b) deriving present information signals indicative of said sensed personal features;

(c) developing a scramble key from said present information signals;

(d) deriving a first set of comparison signals from said present information signals;

(e) sensing said encoded personal identification information signals stored on said portable storage medium;

(f) decoding said encoded personal indentification information signals read from said portable storage medium, said scramble key being used to decode said personal identification information signals;

(g) deriving a second set of comparison signals from said decoded personal identification information signals; and (h) comparing said first and said second set of comprison signals to verify identity of said person.

3. Apparatus for storing scrambled information on a portable storage medium using a coherent light beam comprising:

(a) means for sensing personal features of a person from an image;

(b) converting means connected to said sensing means for producing information signals corresponding to said sensed personal features;

(c) receiving means connected to said converting means for receiving said information signals and developing a distinct scramble key from said information signal;

(d) encoding means connected to said receiving means for encoding the the coherent light beam according to said scramble key to produce an encoded reference light beam; and (e) means, including the portable storage medium, connected to sad encoding means for storing an encoded holographic image on said portable storage medium using said encoded reference light beam.

4. Apparatus for verifying the identity of a person using a portable storage medium on which encoded personal identification information has been stored in a scrambled holographic image comprising:

(a) sensing means for sensing personal features of a person;

(b) processing means connected to said sensing means for deriving present information signals corresponding to said sensed personal features;

(c) coding means connected to said processing means for developing a scramble key from said present information signals and to be used as a first set of comparison signals from said present information signals;

(d) decoding means connected to said coding means for sensing and decoding the scrambled holographic image on said portable storage medium using the scramble key derived from said present information signals; and (e) comparing means, connected to said decoding means, for deriving a second set of comparison signals for comparing said first and said second set of comparison signals to verify identity of said person.

* * * * *